US008570235B2

(12) United States Patent
Ahn et al.

(10) Patent No.: US 8,570,235 B2
(45) Date of Patent: Oct. 29, 2013

(54) SYSTEMS AND METHODS FOR COMPLEMENTARY METAL-OXIDE-SEMICONDUCTOR (CMOS) DIFFERENTIAL ANTENNA SWITCHES USING MULTI-SECTION IMPEDANCE TRANSFORMATIONS

(75) Inventors: Minsik Ahn, Atlanta, GA (US); Chang-Ho Lee, Marietta, GA (US)

(73) Assignee: Samsung Electro-Mechanics, Gyunngi-Do (KR)

( * ) Notice: Subject to any disclaimer, the term of this patent is extended or adjusted under 35 U.S.C. 154(b) by 756 days.

(21) Appl. No.: 12/773,222

(22) Filed: May 4, 2010

(65) Prior Publication Data

US 2011/0273355 A1 Nov. 10, 2011

(51) Int. Cl.
*H01Q 1/50* (2006.01)
*H04B 1/44* (2006.01)
*H01P 1/15* (2006.01)

(52) U.S. Cl.
USPC ............. 343/860; 343/876; 333/103; 455/78; 455/83

(58) Field of Classification Search
USPC ......... 343/860, 876; 333/103, 105, 124, 17.3; 455/78, 82, 83
See application file for complete search history.

(56) References Cited

U.S. PATENT DOCUMENTS 6,009,314 A * 12/1999 Bjork et al. .................... 455/83
6,735,418 B1 * 5/2004 MacNally et al. .............. 455/78
8,022,786 B2 * 9/2011 Lee .............................. 333/101
8,081,047 B2 * 12/2011 Royak et al. .................. 333/132
8,099,062 B1 * 1/2012 Terrovitis ....................... 455/84

OTHER PUBLICATIONS

Minsik Ahn et al. "A 1.8-GHz 33-dBm P 0.1-dB CMOS T/R Switch Using Stacked FETS with Feed-Forward Capacitors in a Floated Well Structure." IEEE Transactions on Microwave Theory and Techniques, vol. 57, No. 11, Nov. 2009. 2661-2670.
Kyu Hwan An et al. "Power-Combining Transformer Techniques for Fully-Integrated CMOS Power Amplifiers." IEEE Journal of Solid-State Circuits, vol. 43, No. 5, May 2008. 1064-1075.
Minsik Ahn et al. "Fully Integrated High Power RF Front-End Circuits in 2 GHz Using 0.18um Standard CMOS Process." Microwave Conference, 2008. APMC 2008. Asia-Pacific. Dec. 16-20, 2008. 4 pages.

* cited by examiner

*Primary Examiner* — Michael C Wimer

(57) ABSTRACT

Example embodiments of the invention are directed to CMOS differential antenna switches with multi-section impedance transformation. The differential architecture can provide relief from large voltage swings of the power amplifiers by distributing the voltage stress over the receiver switch with two of the identical or substantially similar single-ended switches. In order to reduce the voltage stress further, multi-section impedance transformations can be used. Degraded insertion loss due to the impedance transformation technique can be compensated by selecting an optimal impedance for the antenna switch operation. Accordingly, the use of the multi-section impedance transformations with the differential antenna switch architecture enables high power handling capability for the antenna switch with acceptable efficiency for the transmitter module.

19 Claims, 6 Drawing Sheets

SYSTEMS AND METHODS FOR COMPLEMENTARY METAL-OXIDE-SEMICONDUCTOR (CMOS) DIFFERENTIAL ANTENNA SWITCHES USING MULTI-SECTION IMPEDANCE TRANSFORMATIONS

FIELD OF THE INVENTION

The invention relates generally to antenna switches, and more particularly, to systems and methods for complementary metal-oxide-semiconductor (CMOS) differential antenna switches using multi-section impedance transformations.

BACKGROUND OF THE INVENTION

In achieving fully integrated wireless communication systems, an antenna switch is utilized to change modes (e.g., transmit and receive modes) or frequency bands (e.g., high and low bands). In performing these tasks, the insertion loss of the antenna switch should be minimized to guarantee a high efficiency of the transmitter as well as a low noise figure of the receiver. The antenna switch should also isolate the receiver from the transmitter effectively during respective receive and transmit modes, and vice versa. In addition, high power signal from the transmitter should be handled without significant distortions by the antenna switch to preserve the linearity of transmitters.

The power handling capability of an antenna switch depends primarily on the voltage swing over the OFF-state receiver switches of the antenna switch. A large signal from the transmitter induces the unwanted channel formation and forward biases junction diodes of the OFF-state receiver switch devices. Also, this can cause a device breakdown, which results in linearity degradation of the transmitter. Because transmitted signals from a power amplifier can have large voltage swing (e.g., more than 1 W based upon peak-to-peak 20V at 50Ω load) in the case of cellurar applications, reducing the voltage swing over the OFF-state receiver switches is important to enhance the power handling capability of the antenna switches.

The efficiency of a power amplifier is one of the most dominant factors in determining the whole transmitter performance. Particularly, output matching network of the power amplifier takes a critical portion of it. Since the output impedance of the power amplifier is usually small enough to generate a high power signal, the output matching network of the power amplifier is forced to have a large impedance transformation ratio to match the output impedance to the antenna. As the impedance transformation ratio increases, the efficiency of the matching network is typically degraded.

BRIEF SUMMARY OF INVENTION

According to an example embodiment of the invention, there is a CMOS differential antenna switch. The CMOS differential antenna switch may be fabricated using a standard 0.18-μm process, although other process may be utilized without departing from the embodiments of the invention. The CMOS differential antenna switch may include two (or more) identical or substantially similar single-ended antenna switches to relieve the voltage stress in half (or less) on receiver switches by providing two (or more) signal paths. Each single-ended antenna switch may include a plurality of switch devices to sustain the large voltage swing from a transmitter by distributing the stress over the multiple switch devices. The input signal of the differential antenna switch comes through the output matching network of power amplifier (e.g., transformers), and the output signal of the differential antenna switch is combined by an LC balun to transmit the signal via a single-ended antenna.

According to an example embodiment of the invention, there may be an LC balun, which may include plurality of inductors and capacitors. In an example embodiment of the invention, LC balun may combine the output signals of two single-ended antenna switches to transmit the signal through the single-ended antenna, and may provide the optimal impedance for the differential antenna switch operation by impedance transformation. A voltage stress over the receiver switches can be relaxed for a certain level of power with a reduced switch operating impedance which is obtained by implementing the LC balun as an impedance matching network between differential antenna switch and antenna. Thus, the reducing operating impedance of the antenna switch helps to enhance the power handling capability of the antenna switch.

According to an example embodiment of the invention, there may be a transformer as an output matching network of power amplifiers. To generate a high power, output powers of multiple power amplifiers are combined by an output matching network in transmitter systems. In combining the output powers, transformers are widely used due to its advantage of compact size comparing to the LC counterparts. Since the efficiency of the transformer usually depends on its impedance transformation ratio, the efficiency can be improved by reducing the impedance for the antenna switch operation minimizing the impedance transformation ratio of the transformer. Particularly, since the quality factor of the inductors used in the transformer is higher when it operates in differential mode than in single-ended mode, efficiency of the transformer is enhanced even more by implementing a differential antenna switch at the output of the transformer.

According to an example embodiment of the invention, there may be a transmitter module which consists of an antenna switch and a power amplifier. By implementing multi-section impedance transformation networks with transformer and LC balun, to match the low impedance of the output of a power amplifier to 50Ω antenna, for example, the burden of impedance transformation is distributed to those two matching networks. Since the output impedance of the power amplifier is typically low, the optimal impedance for the high power antenna switch operation can be positioned between the output impedance of the power amplifier and the antenna impedance. As a result, power handling capability of the antenna switch and the efficiency of the transmitter module can be enhanced at the same time, by employing a two-step impedance matching with a proper choice of the optimal impedance for the antenna switch operation even though an additional matching network is implemented.

BRIEF DESCRIPTION OF THE DRAWINGS

Figure 1A:
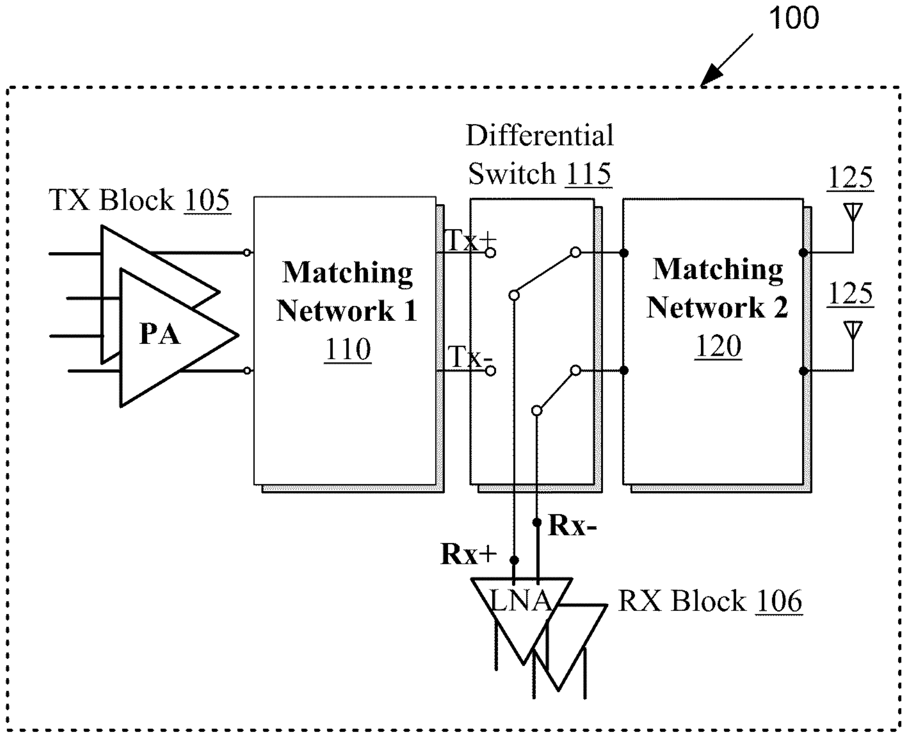
Figure 1B:
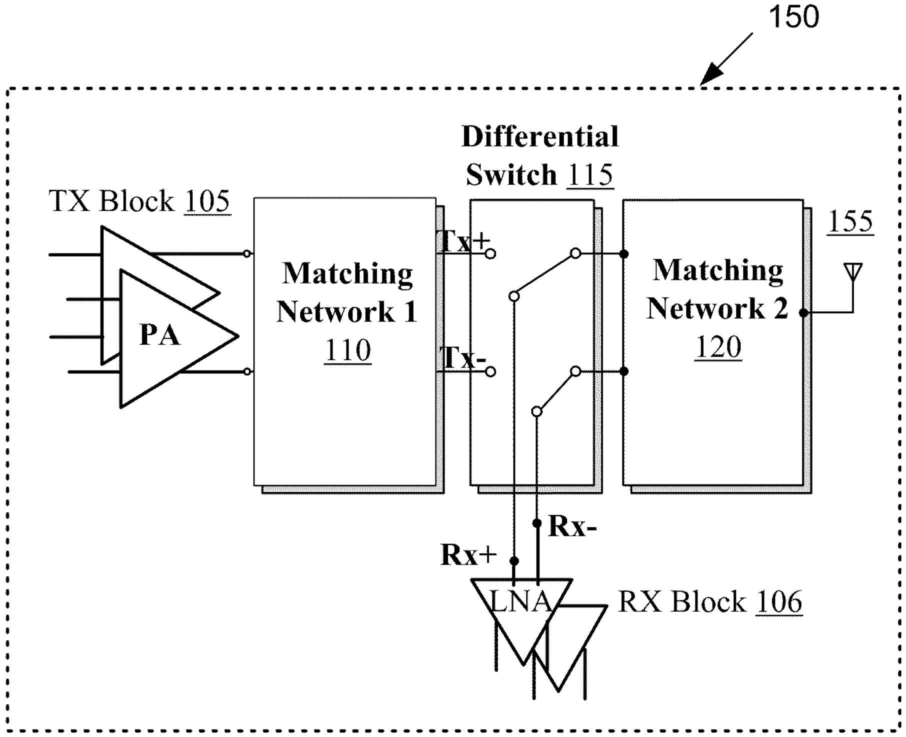

Having thus described the invention in general terms, reference will now be made to the accompanying drawings, which are not necessarily drawn to scale, and wherein:

FIGS. 1A and 1B illustrates block diagrams of example systems for supporting example differential antenna switch, according to an example embodiment of the invention.

Figure 2A:
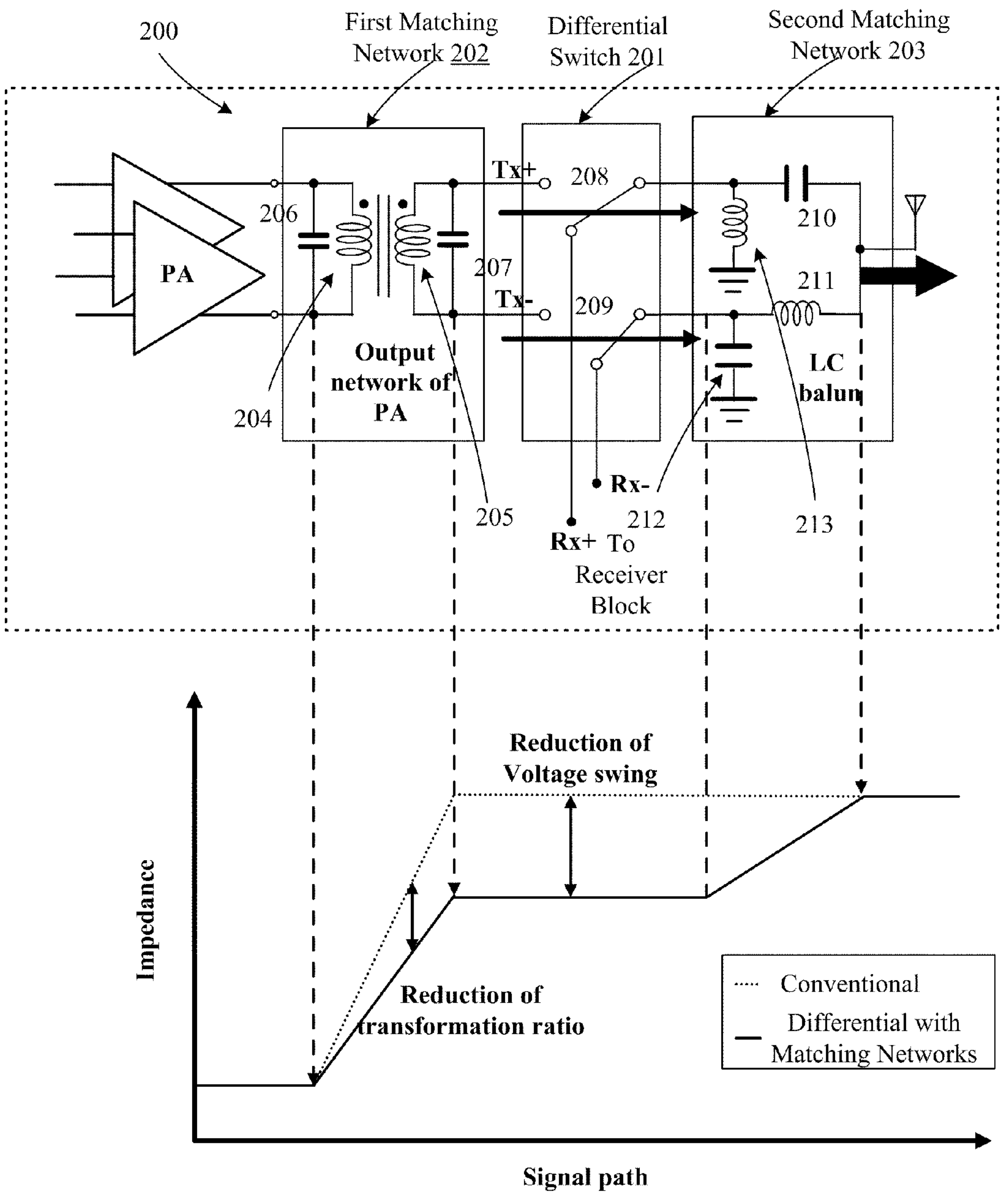

FIG. 2A illustrates a block diagram of an example system supporting a differential antenna switch with multi-section impedance transformation, according to an example embodiment of the invention.

Figure 2B:
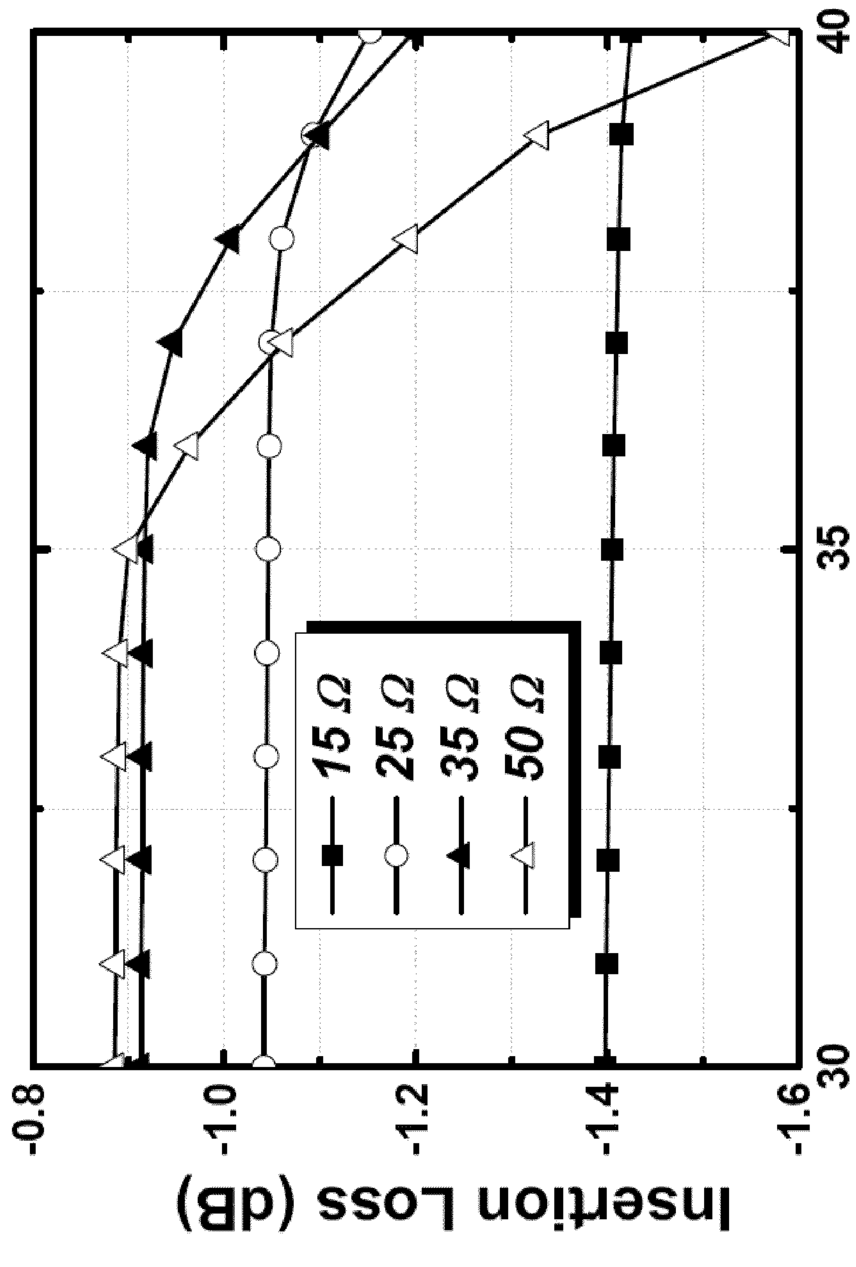

FIG. 2B illustrates simulation results of the power handling capability of a transmitter module, which includes a differential antenna switch, a transformer, and an LC balun, for various differential antenna switch operating impedances, according to an example embodiment of the invention.

Figure 3A:
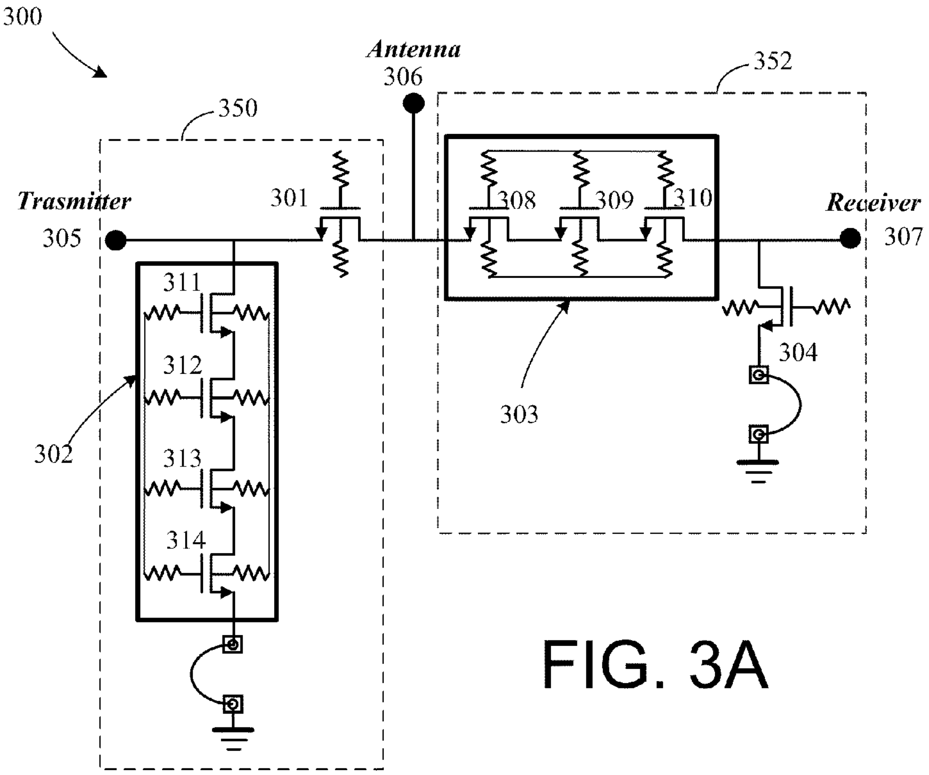

FIG. 3A illustrates detailed circuit diagram of a single-ended switch utilized as part of a differential antenna switch block, according to an example embodiment of the invention.

Figure 3B:
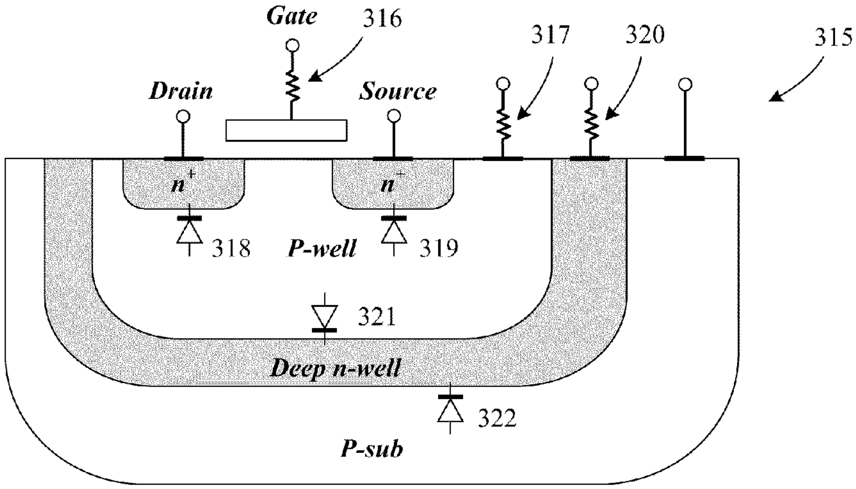

FIG. 3B illustrates cross section of an example MOSFET that can be used for a switch device in differential antenna switch, according to an example embodiment of the invention.

Figure 4:
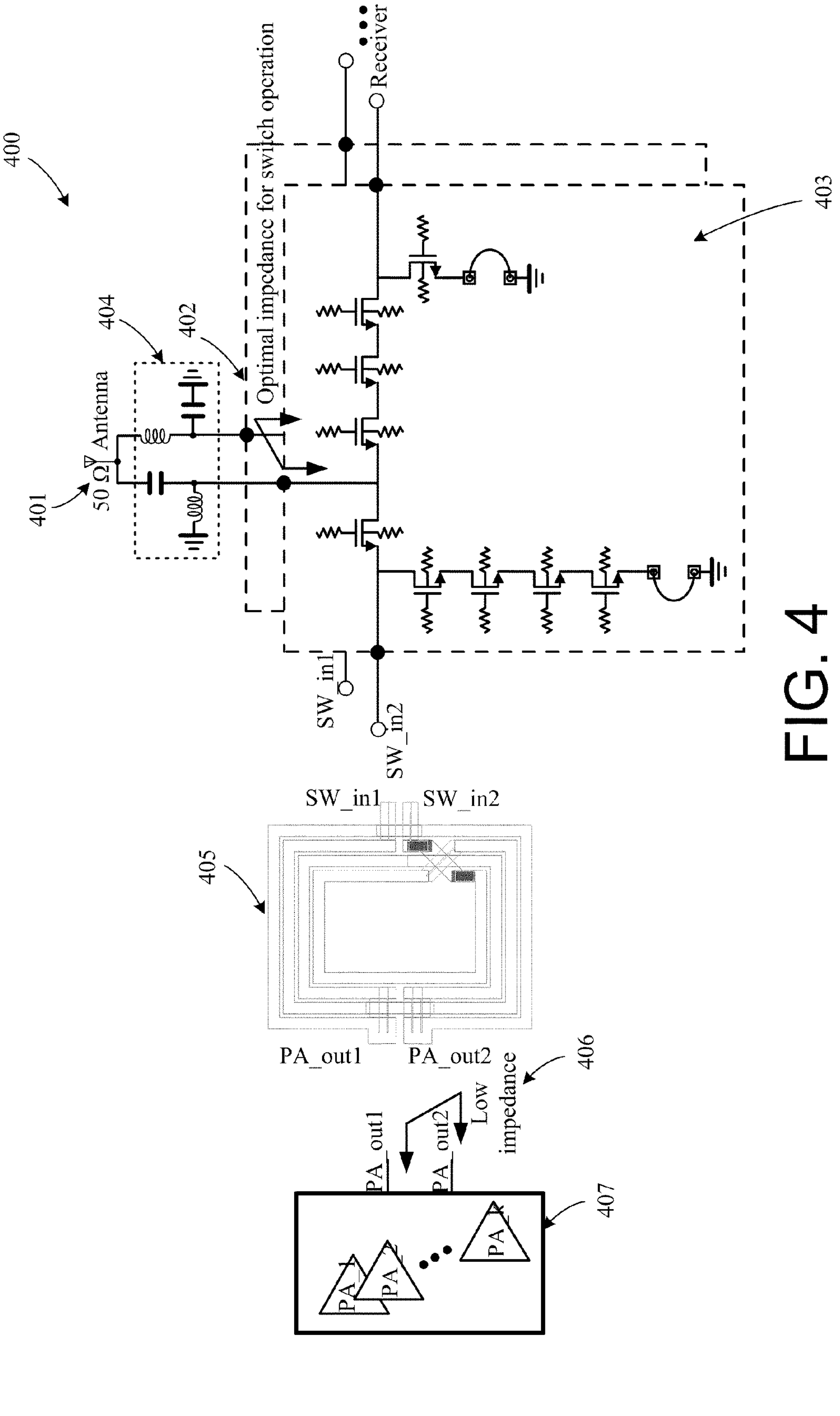

FIG. 4 illustrates an example system for a differential antenna switch using an example multi-section impedance transformation technique, according to an example embodiment of the invention.

Figure 5:
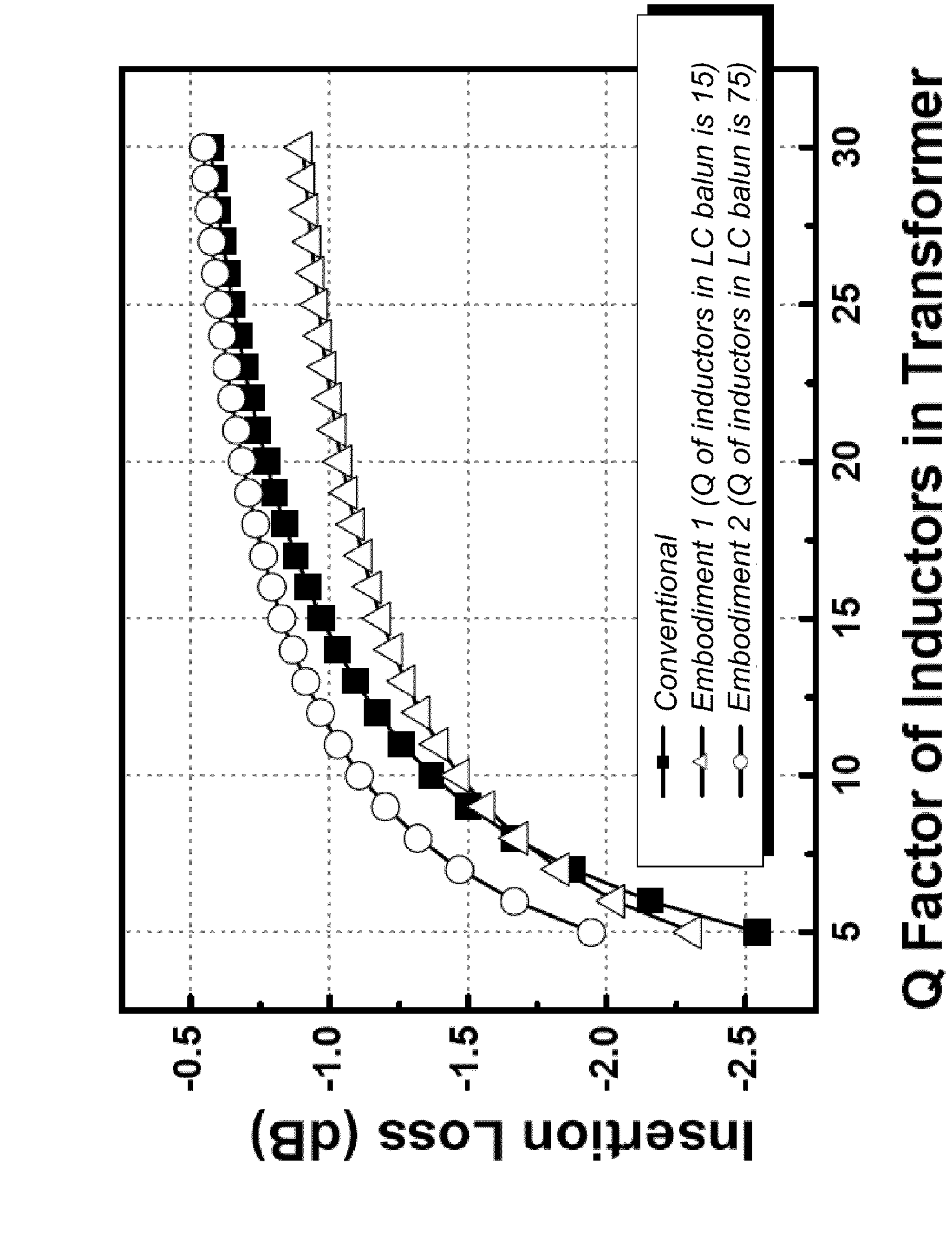

FIG. 5 illustrates simulated insertion losses of antenna switches including the matching networks, according to an example embodiment of the invention.

DETAILED DESCRIPTION OF THE INVENTION

Example embodiments of the invention now will be described more fully hereinafter with reference to the accompanying drawings, in which some, but not all embodiments of the invention are shown. Indeed, these inventions may be embodied in many different forms and should not be construed as limited to the embodiments set forth herein rather, these embodiments are provided so that this disclosure will satisfy applicable legal requirements. Like numbers refer to like elements throughout.

Example embodiments of the invention may provide for complementary metal-oxide-semiconductor antenna switches. To increase the power handling capability of the CMOS antenna switches, differential switches can be utilized in conjunction with multi-section impedance transformations described herein. Compared to a non-differential structure, differential switches may reduce voltage stress on receiver switches by spreading voltage stress across two or more parallel signal paths. Indeed, the differential architecture may help to relieve the large voltage swing from power amplifiers by distributing the voltage stress over the receiver switch with two or more of the identical or substantially similar single-ended switches.

Likewise, multi-section impedance transformations described herein can be utilized to provide at least (i) a first impedance transformation network between amplifiers (e.g., power amplifiers) and first ports of the differential switch (e.g., from a few ohms to 35 ohms), and (ii) a second impedance transformation network/stage between second ports of the differential switch and at least one antenna (e.g., from 35 ohms to 50 ohms). The combination of the first and impedance transformation networks/stages can provide an effective impedance transformation need to match the output impedance of the amplifiers to that of the at least one antenna. However, the use of two stages relaxes the impedance transformation to be performed by the first impedance transformation network/stage between the amplifiers and the first ports of the differential switch. In particular, since only a portion of the full impedance transformation between the amplifiers and the antenna is being performed by the first impedance transformation network/stage, the operating impedance of the differential antenna switch may be reduced. This reduction in the operating impedance may help to relieve the impedance transformation ratio of the first impedance transformation network/stage, thereby resulting in an improved efficiency of the matching network for the first impedance transformation network/stage. It will be appreciated that any degraded insertion loss due to the impedance transformation technique can be compensated for by selecting an optimal impedance for the antenna switch operation. In this way, the use of the multi-section impedance transformation technique with the differential antenna switch architecture may enable to achieve a high power handling capability for the antenna switch and a reasonable efficiency for the transmitter module at the same time, according to an example embodiment of the invention.

FIG. 1A illustrates a block diagram of a system 100 for supporting example differential antenna switch, according to an example embodiment of the invention. As shown in FIG. 1A, the system 100 may include a transmit (TX) block 105, a receive (RX) block 106, a first matching network 110, a differential antenna switch block 115, a second matching network, and differential antennas 125, according to an example embodiment of the invention. In FIG. 1A, the TX block 105 can include one or more differential power amplifiers (PAs). Likewise, the RX block 105 can include one or more low noise amplifiers (LNAs).

During a transmit (TX) mode, the differential outputs of the differential PAs can be provided to respective switches of the differential antenna switch block 115 via a first matching network 110. The first matching network 110 may be operative to perform an a first impedance transformation to increase the impedance between the PA differential outputs and the differential antenna switch block 115. The amount of the first impedance transformation may be selected in order to reduce the operating impedance of the differential antenna switch block 115, thereby resulting in an improved efficiency of the first matching network 110. Likewise, degraded insertion loss due to the first impedance transformation can be compensated for by selecting an optimal impedance for the differential antenna switch block 115 operation. It will be appreciated that the first matching network 110 can comprise passive devices such as one or more of a transformer, inductor, capacitor, resistor, etc. However, the matching network 110 can likewise comprise one or more active devices as well without departing from example embodiments of the invention. The matching network 110 can also be configured to combine differential outputs from a plurality of PAs of the TX block according to an example embodiment of the invention.

The differential antenna switch block 115 may include at least two functional switches provide the equivalent of at least two single-ended logical switches for communicating differential outputs from the transmitter block. The respective switches of the differential switch block can be implemented using one or more transistors such as MOSFETS used in a CMOS technology. However, it will be appreciated that other transistors and FETs can be utilized for implementing the logical switches of the differential antenna switch block 115 without departing from example embodiments of the invention.

During the transmit (TX) mode, the differential antenna switch block 115 can operate the switches to communicate the differential outputs of the first matching network 110 to the differential inputs of a second matching network 120. The second matching network 120 may be operative to perform a second impedance transformation to increase the impedance between the outputs of the differential antenna switch block 115 and the two or more differential antennas 125. Generally, the differential nature of the outputs of the differential antenna switch block 115 may be preserved by the second matching network 120 and delivered to the respective differential antennas 125, thereby providing from a fully differential system. Likewise, the second matching network 120 can include respective impedance transformation paths for each differential signal path. It will be appreciated that the second matching network 120 can comprise passive devices such as one or more of a transformer, inductor, capacitor, resistor, etc. However, the matching network 120 can likewise comprise one or more active devices as well without departing from example embodiments of the invention.

It will be appreciated that the combination of the impedance transformations of the first matching network 110 and the second matching network 120 may be sufficient to increase the output impedance of the PAs of TX block 150 to match the impedance of antennas 125.

Still referring to FIG. 1A, the differential antenna switch module 115 can be operated for a receive (RX) mode. In particular, the differential antenna switch module 115 can configure the switches to connect the second matching network 120 to the input of the receiver (RX) block. Accordingly, during an RX mode, the antennas 125 can receive differential input signals, which are processed with impedance transformation by the second matching network 120 and delivered to the RX block 106 via the differential antenna switch module 115. The second matching network 120 can be adjusted, perhaps using adjustable components (e.g., variable capacitor, resistor, etc.) or switching, as necessary to match the impedance of the antennas 125 to the input of the receiver block 106, which can include one or more low noise amplifiers (LNAs).

It will be appreciated that many variations of the system 100 of FIG. 1A are available without departing from example embodiments of the invention. For example, FIG. 1B illustrates an example variation of FIG. 1A. The system 150 of FIG. 1B is similar to the system 100 of FIG. 1A. However, in the system 150 of FIG. 1B, there is a single-ended antenna 155 instead of differential antennas 125. During a transmit (TX) mode, the differential signals from the differential antenna switch block 115 are converted by the second matching network 120 to a single-ended signal for transmission via the single-ended antenna 155. Likewise, during a receive (RX) mode, the single-ended signal received by the single-ended antenna are converted to differential signals for receipt by the RX block 106. To perform the conversion from differential signals to a single-ended signal, and vice versa, the matching network 120 can include one or more baluns, according to an example embodiment of the invention.

FIG. 2A illustrates a block diagram of an example system 200 supporting a differential antenna switch with multi-section impedance transformation, according to an example embodiment of the invention. The system 200 of FIG. 2A may represent an example implementation of FIG. 1B, according to an example embodiment of the invention. However, the second matching network 203 of FIG. 2A could also be modified so that FIG. 2A can likewise be used as an implementation of FIG. 1A, according to an example embodiment of the invention.

As shown in the example embodiment of FIG. 2A, the system 200 may include a differential antenna switch 201, a first matching network 202, and a second matching network 203. For purposes of a transmit (TX) mode, the first matching network 203 can comprise a transformer as a differential output matching network of one or more of the differential power amplifiers (PAs) 250. The first matching network 203 can also include an input capacitor 206, and an output capacitor 207 connected to the respective input and output ports of the transformer to enable the PA to have an optimal matching for the performance of the transmitter module. The first matching network 203 can be used to perform a first impedance transformation to increase the impedance of the PA outputs to an impedance of operation of the differential antenna switch 201. The first matching network 203 can also be used to combine differential outputs from a plurality of differential PAs 250, while maintaining a differential configuration and providing differential outputs. For purposes of illustration only, the transformer 202 can include a one-turn primary winding 204 that is inductively coupled to a two-turn secondary winding 205, according to an example embodiment. It will be appreciated that the transformer 202 can have various numbers of turns in the primary winding 204 and the secondary winding without departing from example embodiments of the invention.

The second matching network 203 can include an LC balun in order to convert balanced, differential signals to an unbalanced, single-ended signal for TX mode, and a single-ended signal to differential signals for RX mode, according to an example embodiment of the invention. As shown in FIG. 2, an example LC balun can comprise a capacitor 210 and inductor 211 for the impedance transformation, and another capacitor 212 and inductor 213 for tuning. Accordingly, the second matching network 203 can perform a second impedance transformation to increase the impedance of the differential antenna switch 201 outputs to an impedance of the single-ended antenna 255. It will be appreciated that many variations of the second matching network/LC balun, including the use of additional capacitors and/or inductors, are available without departing from example embodiments of the invention.

Differential antenna switch 201 includes two identical or substantially similar single-ended switches 208 and 209, which are switched from a respective first position to a respective second position, or vice versa, depending on whether a TX mode or RX mode is selected. For example, the single-ended switches 208, 209 can be operated in a respective first position to connect the differential outputs of PAs 250/first matching network 202 to the second matching network 203. On the other hand, the single-ended switches 208, 209 can be operated in a respective second position to connect the antenna 255/second matching network 203 to the receiver block, according to an example embodiment of the invention.

With continued reference to FIG. 2A, differential antenna switch 201 is operated with a reduced impedance by the LC balun of the second matching network 203 to improve its power handling capability. However, insertion loss of the differential antenna switch 201 can be increased along with an excessively low operating impedance, since the amount of current flowing is also increased as voltage swing reduces (for a certain level of power) resulting in loss due to on-resistance of the differential antenna switches. Thus, the optimal impedance for the antenna switch operation may be selected by considering a trade-off between the power performance of the differential antenna switch 201 and the loss of the entire signal path, from the first output matching network 202 of power amplifier to the antenna, as shown in FIG. 2B. The reduced operating impedance of the differential antenna switch 201 can also help to relieve the impedance transformation ratio of the output matching network 202 of the power amplifier, thereby resulting in an improvement of efficiency of the matching network 202.

FIG. 2A also illustrates the impedance transformation provided by the first matching network 202 and the second matching network 203. As shown in FIG. 2A, the first matching network 202 is able to perform a first intermediate impedance transformation, thereby reducing the transformation ratio compared to conventional matching networks that match the output of a PA to the impedance of the antenna. Thus, the differential switch 201 can operate at a lower impedance, with a concurrent reduction in the voltage swing compared with the conventional matching networks. The second matching network 203, which operates following the differential switch 201 in a TX mode, can then match the output impedance of the differential switch 201 to the antenna 255.

FIG. 2B illustrates simulation results of the power handling capability of a transmitter module, which includes a differential antenna switch, a transformer, and an LC balun, for various differential antenna switch operating impedances.

FIG. 3A illustrates detailed circuit diagram of a single-ended switch 300 utilized as part of a differential antenna switch block, according to an example embodiment of the invention. For example, two of the single-ended switches 300 shown in FIG. 3 may be used in a differential antenna switch block (e.g., differential switch 115 or 201). As shown in FIG. 3A, each single-ended switch 300 can comprise an antenna 306 connectable to a transmitter block 305 via a transmitter switch 350, and likewise connectable to a receiver block 307 via a receiver switch 352. The transmitter switch 350 can include a series transmit switch device 301, and a shunt transmit switch 302. The series transmit switch device 301 may be utilized to provide the main transmit signal path from transmitter block 305 to the antenna 306 during a transmit (TX) mode. The shunt switch 302 may be utilized to improve the isolation between the transmitter block 305 and the receiver block 307. For example, in an RX mode when the receiver block 307 is ON and the transmit block 305 is OFF, the shunt switch 302 may be enabled connect the main transmit signal path to ground.

The receiver switch 350 can include a series receive switch 303, and a shunt receive switch device 304. The series receive switch 303 may be utilized to provide the main receive signal path from the antenna 306 to the receiver block 307 during an receive (RX) mode. The shunt switch device 304 may be utilized to improve the isolation between the receiver block 307 and the transmitter block. For example, in a TX mode when the transmit block 305 is ON and the receiver block 307 is OFF, the shunt switch device 304 may be enabled to connect the main receive signal path to ground.

Still referring to FIG. 3A, in TX mode, the series transmit switch device 301, and the shunt receive switch device 304 are turned ON, and switches 302, 303 are turned OFF. As a result, the signal flows from the transmitter block 305 to the antenna 306. On the other hand, in an RX mode, the series receive switch 303, and the shunt transmit switch 302 are turned ON, and switches 301, 304 are turned off. In this mode, signal comes through the antenna 306, and flows to the receiver block 307.

It will be appreciated that the shunt transmit switch 302 and the series receive switch 303 should be able to sustain a large voltage stress from a transmitter because the switches are in an OFF-state during the TX mode. In order to avoid channel formation of OFF-state switches and breakdown of these devices, switch devices may be stacked for the shunt transmit switch 302 and the series receive switch 303. By stacking the switch devices, the large voltage swing may be distributed to the stacked devices reducing the voltage stress on each of the switch device. However, the insertion loss and the isolation in receive mode may be degraded as the number of stacked devices increases. Thus, the number of stacked devices should be chosen by considering the trade-off between the power handling capability in transmit mode and the insertion loss in receive mode. In an example embodiment of the invention, three switch devices 308, 309, and 310 are stacked for the series receive switch 300. More specifically, the drain of device 308 can be connected to the source of device 309, and the drain of device 309 can be connected to the source of block 310. Likewise, the four switch devices 311, 312, 313, and 314 are stacked for the shunt transmit switch 302. In particular, the source of device 311 is connected to the drain of device 312. The source of device 312 is connected to the drain of device 313, and the source of device 313 is connected to the drain of device 314. These switch devices illustrated in FIG. 3A may be implemented as MOSFETs, perhaps with thick gate-oxide devices to protect the devices from a breakdown phenomenon, according to an example embodiment of the invention.

FIG. 3B illustrates cross section of an example MOSFET 315 that can be used for a switch device in differential antenna switch, according to an example embodiment of the invention. For example, the example MOSFET 315 can be used for implementing any of switch devices 301, 304, 308, 309, 310, 311, 312, 313, 114 in FIG. 3A.

As shown in FIG. 3B, the gate of the example MOSFET 315 used as a switch device is biased at the gate through large resistor/resistance value 316 to achieve a high AC isolation. Without the resistor 316, device breakdown or unwanted channel formation may occur by the large signal from the transmitter, according to an example embodiment of the invention. The body of the MOSFET 315 is also biased using a large resistor/resistance value 317 to enhance the power handling capability of the antenna switch by preventing the junction diodes 318, and 319 from forward biasing. The MOSFET 315 used as a switch device can use the deep n-well structure to separate the p-well (body) and p-substrate enabling to bias the p-well. Deep n-well ports can also be fed through a large resistor/resistance value 320. In order to prevent junction diodes between p-well (body) and deep n-well 321 from forward biasing, p-well ports and deep n-well ports can be biased at negative and positive supply, respectively, which also bias junction diodes between deep n-well and p-substrate 322 reversely.

FIG. 4 illustrates an example system 400 for a differential antenna switch using an example multi-section impedance transformation technique, according to an example embodiment of the invention. In FIG. 4, 50Ω of the antenna impedance 401 may be converted by a matching network 404 (e.g., an LC balun) to the optimal impedance 402 present at the differential antenna switch 403 to improve the power performance of the differential antenna switch 403. The matching network 404 may be designed for one or more target frequencies by selecting the appropriate value of included inductors and capacitors, thereby allowing for usage across various applications. The optimal impedance 402 for the differential antenna switch 403, which is obtained by the matching network 404 may be lower than the antenna impedance 401 according to the simulation results in FIG. 2B. Thus, the efficiency of the other matching network (e.g., transformer) 405 can be enhanced by reducing the burden of the large impedance transformation ratio, in transforming the antenna switch impedance 402 to the low impedance 406 which is required at the output of power amplifiers to generate the high power. With the high power handling capability of the antenna switch and the reasonable efficiency of the matching networks 404 and 405, high power can be linearly transmitted to the air with small losses, according to an example embodiment of the invention.

Still referring to FIG. 4, the efficiency of the transformer 405 may be improved with a differential architecture because the quality factor of the inductors used in the transformer 405 may be higher when it operates in differential mode than in single-ended mode. Furthermore, as described herein, the differential architecture may be desirable in designing antenna switches enhancing the power handling capability of the antenna switch. Therefore, power handling capability and insertion loss (efficiency) of the transmitter module may be improved by implementing differential power amplifiers 407 and differential antenna switches 403 achieving a fully differential transmitter module. A plurality of differential power amplifiers 407 may be employed to generate a high output power, and its output power can be combined by matching network (e.g., transformer) 405, which can include a plurality of differential inputs and differential outputs.

FIG. 5 illustrates simulated insertion losses of antenna switches including the matching networks. As shown in FIG. 5, there is a comparison of simulated results for the insertion losses for a conventional structure, and for two example embodiments that may be implemented similarly to FIG. 2A. For the simulation for the example embodiments, the impedance for the differential antenna switch operations were chosen considering a trade-off between insertion loss and power handling capability of the differential antenna switch. In order to verify the availability of the integration, LC baluns, where are implemented by on-chip components (quality factor of the inductors is assumed 15), and off-chip components (quality factor of the inductors is assumed 75) are used and compared in the simulation. On the basis that the quality factor of inductors in on-chip transformer is around 10, both of the on-chip and the off-chip LC baluns in the example embodiments may be acceptable in terms of efficiency (insertion loss), even though an additional matching network is implemented. In the case of the off-chip LC balun, efficiency is obviously improved. In other words, the power handling capability of the antenna switch may be enhanced and loss is kept in reasonable level in accordance with the differential structures and multi-section impedance transformations described herein in accordance with example embodiments of the invention.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for an antenna switch, comprising:

at least one differential amplifier that generates differential outputs;

a differential antenna switch block, wherein the differential antenna switch block includes at least a first single-ended switch and a second single-ended switch;

a first matching network to provide a first impedance transformation between the at least one differential amplifier and the differential antenna switch block, wherein the first matching network communicates each of the differential outputs of the at least one differential amplifier to respective ones of the first and second single-ended switches; and a second matching network to provide a second impedance transformation between the differential antenna switch block and at least one antenna, wherein the second matching network receives differential signals from the differential antenna switch block, and provides at least one system output signal to the at least one antenna;

wherein the first impedance transformation and the second impedance transformation collectively provide a total impedance transformation to match a first impedance of the differential amplifier with a second impedance of the at least one antenna, and further wherein each of the first single-ended switch and the second single-ended switch comprise:

a series receive switch operable to selectively connect or disconnect a main receive signal path between the at least one antenna and a receiver (RX) block, wherein the series receive switch includes a plurality of first transistors;

a shunt receive switch operable to selectively connect or disconnect the main receive signal path to or from ground;

a series transmit switch operable to selectively connect or disconnect a main transmit signal path between a transmitter (TX) block and the at least one antenna; and a shunt transmit switch operable to selectively connect or disconnect the main transmit signal path to or from ground, wherein the shunt transmit switch includes a plurality of second transistors.

2. The system of claim 1, wherein during a transmit mode, the series transmit switch and the shunt receiver switch are enabled, and the shunt transmit switch and the series receive switch are disabled, and wherein during a receive mode, the series receive switch and the shunt transmit switch are enabled, and the series transmit switch and the shunt receiver switch are disabled.

3. The system of claim 1, wherein the RX block includes at least one low-noise differential amplifier, wherein the main receive signal path between the first antenna and the RX block includes at least a portion of the second matching network, wherein the TX block includes at least one differential power amplifier, wherein the main transmit signal path between the transmitter (TX) block and the second antenna includes at least a portion of the first matching network and the second matching network.

4. The system of claim 1, wherein at least one of the first transistors or the second transistors are MOSFETs.

5. The system of claim 1, wherein the at least one differential amplifier, the first matching network, the differential antenna switch block, and the second matching network operate with a differential architecture, wherein the differential architecture increases power handling capability of the differential antenna switch block.

6. The system of claim 1, wherein multi-section impedance transformation provided by the first and second impedance transformations of the first and second matching networks increases an efficiency of a transmitter module comprising at least one differential power amplifier and the differential antenna switch block.

7. The system of claim 1, wherein the at least one system output signal includes a first system differential output signal and a second system differential output signal, wherein the at least one antenna comprises a first differential antenna for receiving the first system differential output signal, and a second differential antenna for receiving the second system differential output signal.

8. The system of claim 1, wherein the second matching network further includes a balun for converting the received differential signals into a single-ended system output signal, wherein the at least one antenna includes a single-ended antenna for receiving the single-ended system output signal.

9. The system of claim 1, wherein the at least one differential amplifier includes a plurality of differential amplifiers, wherein the first matching network includes at least one transformer for performing power combining of the differential outputs of the plurality of differential amplifiers.

10. A CMOS differential antenna switch comprising two single-ended antenna switches for operating with respective first and second differential signals, wherein each single-ended antenna switch comprises:

a respective series receive switch operable to selectively connect or disconnect a respective main receive signal path between at least one antenna and a receiver (RX) block, wherein the respective series receive switch includes a respective plurality of first transistors;

a respective shunt receive switch operable to selectively connect or disconnect the respective main receive signal path to or from ground;

a respective series transmit switch operable to selectively connect or disconnect a respective main transmit signal path between a transmitter (TX) block and the at least one antenna; and a respective shunt transmit switch operable to selectively connect or disconnect the respective main transmit signal path to or from ground, wherein the respective shunt transmit switch includes a respective plurality of second transistors.

11. The CMOS differential antenna switch of claim 10, wherein the at least one antenna comprises a pair of differential antennas, including a first antenna and a second antenna, wherein the first antenna is connectable by a first of the two single-ended antenna switches, and wherein the second antenna is connectable by a second of the two single-ended antenna switches.

12. The CMOS differential antenna switch of claim 10, wherein the at least one antenna includes a single antenna, wherein a matching network having a balun is provided between the single antenna and the two single-ended antenna switches for converting between the first and second differential signals and a single-ended signal available at the single antenna.

13. The CMOS differential antenna switch of claim 10, wherein the balun includes an LC balun having at least one inductor and at least one capacitor.

14. The CMOS differential antenna switch of claim 10, wherein during a transmit mode, the respective series transmit switch and the respective shunt receiver switch are enabled, and the respective shunt transmit switch and the respective series receive switch are disabled, and wherein during a receive mode, the respective series receive switch and the respective shunt transmit switch are enabled, and the respective series transmit switch and the respective shunt receiver switch are disabled.

15. The CMOS differential antenna switch of claim 10, wherein the TX block includes the at least one differential power amplifier, wherein the respective main transmit signal path between the transmitter (TX) block and the at least one antenna includes a first matching network and a second matching network, wherein the first matching network provides a first impedance transformation between the at least one differential power amplifier and the two single-ended antenna switches, wherein the second matching network provides a second impedance transformation between the two single-ended antenna switches and the at least one antenna.

16. The CMOS differential antenna switch of claim 15, wherein the at least one differential power amplifier includes a plurality of differential power amplifiers, wherein the first matching network includes a transformer for performing the first impedance transformation and for combining output powers of the plurality of differential power amplifiers.

17. The CMOS differential antenna switch of claim 15, wherein multi-section impedance transformation provided by the first and second impedance transformations of the first and second matching networks increases an efficiency of a transmitter module comprising at least the differential power amplifier the two single-ended antenna switches, wherein the two single-ended antenna switches are provided according to a differential configuration to increase a power handling capability of the CMOS differential antenna switch.

18. The CMOS differential antenna switch of claim 10, wherein the plurality of first transistors or the plurality of second transistors are in a stacked configuration in which transistors are stacked from respective sources to respective drains.

19. The CMOS differential antenna switch of claim 10, wherein the respective series receive switch, the respective shunt receive switch, the respective series transmit switch, and the respective shunt transmit switch are implemented using MOSFETs.

* * * * *